United States Patent
Erk

(10) Patent No.: US 10,752,547 B2
(45) Date of Patent: *Aug. 25, 2020

(54) CEMENTITIOUS MIXTURES, COMPOSITIONS FOR USE IN CEMENTITIOUS MIXTURES, AND METHODS OF PRODUCING CEMENTITIOUS MIXTURES

(71) Applicant: Purdue Research Foundation, West Lafayette, IN (US)

(72) Inventor: Kendra Ann Erk, West Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/138,339

(22) Filed: Sep. 21, 2018

(65) Prior Publication Data

US 2019/0092687 A1    Mar. 28, 2019

Related U.S. Application Data

(62) Division of application No. 15/137,902, filed on Apr. 25, 2016, now Pat. No. 10,081,573.

(60) Provisional application No. 62/154,183, filed on Apr. 29, 2015.

(51) Int. Cl.
| | | |
|---|---|---|
| C04B 24/26 | (2006.01) | |
| C04B 28/28 | (2006.01) | |
| C04B 40/06 | (2006.01) | |
| C04B 103/00 | (2006.01) | |
| C04B 111/20 | (2006.01) | |

(52) U.S. Cl.
CPC ...... *C04B 24/2652* (2013.01); *C04B 40/0633* (2013.01); *C04B 2103/0049* (2013.01); *C04B 2103/0051* (2013.01); *C04B 2111/29* (2013.01); *C04B 2201/52* (2013.01)

(58) Field of Classification Search
CPC ...... C04B 24/24; C04B 24/26; C04B 24/2652
See application file for complete search history.

(56) References Cited

PUBLICATIONS

Bai et al (Preparation and research of superabsorbent polymers composited with kaolin and poly(AA—co—AM), New Chemical Materials, vol. 42 No. 2, p. 47-49, 2014) (Year: 2014).*

English translation of Bai et al (Preparation and research of superabsorbent polymers composited with kaolin and poly(AA—co—AM), New Chemical Materials, vol. 42 No. 2, p. 47-49, 2014) (Year: 2014).*

Wang et al (The study on preparation of kaolin-acrylic super absorbent polymer and its internal curing effect in the hydration procedure of cement materials, Advanced Materials Research vols. 622-623, p. 276-279, 2012). (Year: 2012).*

* cited by examiner

*Primary Examiner* — Wenwen Cai
(74) *Attorney, Agent, or Firm* — Hartman Global IP Law; Gary M. Hartman; Domenica N. S. Hartman

(57) ABSTRACT

Cementitious mixtures, compositions for use in cementitious mixtures, and methods of producing cementitious mixtures wherein the compositions are suitable for modifying or improving certain properties of the cementitious mixtures. The compositions include a superabsorbent polymer (SAP) hydrogel having a macromolecular network structure, and at least one pozzolanic material that is chemically incorporated into the macromolecular network structure of the SAP hydrogel.

16 Claims, 10 Drawing Sheets

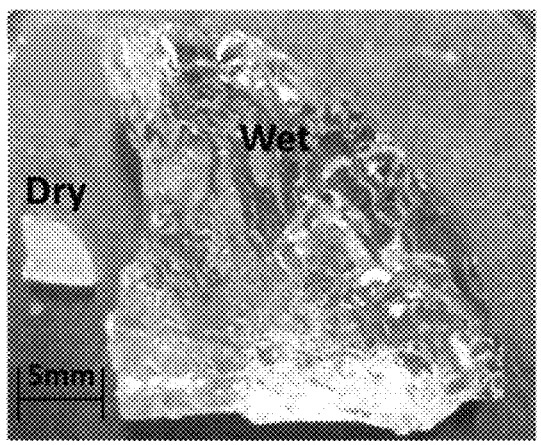 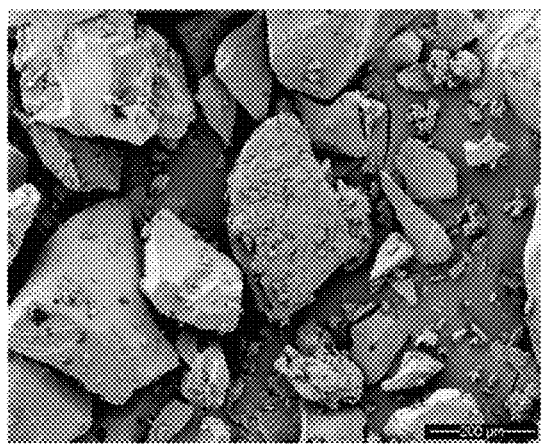
FIG. 1A　　　　　　　　FIG. 1B
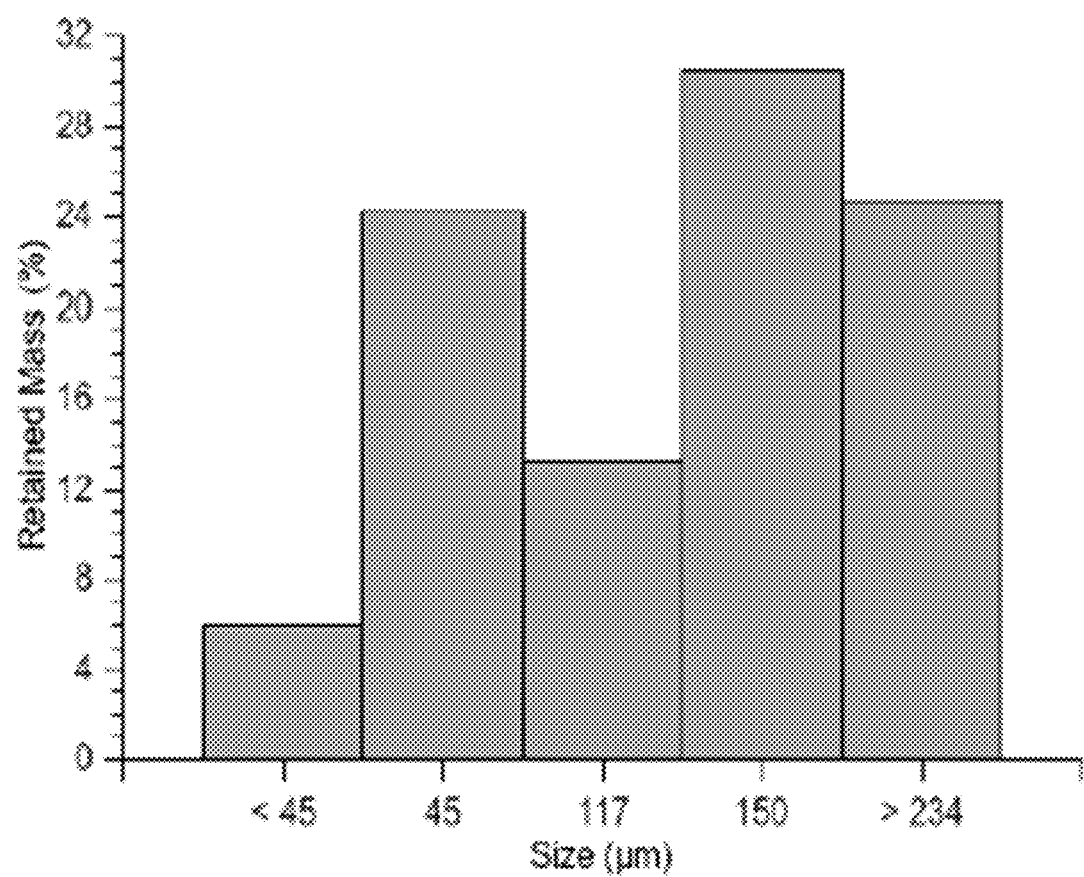
FIG. 1C

CEMENTITIOUS MIXTURES, COMPOSITIONS FOR USE IN CEMENTITIOUS MIXTURES, AND METHODS OF PRODUCING CEMENTITIOUS MIXTURES

CROSS REFERENCE TO RELATED APPLICATIONS

This is a division patent application of co-pending U.S. patent application Ser. No. 15/137,902, filed Apr. 25, 2016, which claims the benefit of U.S. Provisional Application No. 62/154,183, filed Apr. 29, 2015. The contents of these prior applications are incorporated herein by reference.

STATEMENT REGARDING FEDERALLY SPONSORED RESEARCH

This invention was made with government support under Contract No. 1454360-CMMI awarded by the National Science Foundation and Contract No. 1333468-DGE awarded by the National Science Foundation. The Government has certain rights in the invention.

BACKGROUND OF THE INVENTION

The present invention generally relates to cementitious compositions. The invention particularly relates to cementitious compositions containing internal curing agents and mineral admixtures.

Cementitious compositions for forming high-performance concrete (HPC) and ultra-high-performance concrete (UHPC) commonly include various additives intended to improve various properties of the compositions and the concrete they produce. Such additives may include any ingredients other than Portland cement, water, and aggregate that are added to the composition before or during mixing. These additives are referred to herein as admixtures.

Portland-pozzolan blended cement typically contains 20-25 wt. % of a pozzolan (also referred to herein as a pozzolanic material), resulting in significant energy and cost savings as less Portland cement can be used. A pozzolan is defined by ASTM C125 (ASTM: American Society for Testing Materials) as a siliceous or siliceous/aluminous material that will chemically react with calcium hydroxide ($Ca(OH)_2$) and/or calcium cations ($Ca^{2+}$) in the presence of water (referred to herein as pozzolanic reaction or reactions) at ordinary temperatures to form compounds with cementitious properties (including C—S—H which provides long-term strength and durability to concrete). During setting, pozzolanic reactions result in improved resistance to thermal cracking due to a relatively low heat of hydration (roughly half that of pure Portland cement). Additionally, the pozzolanic reaction products of very fine (sub-micron) siliceous materials are more efficient at filling capillary spaces within the cement paste without the formation of large expansive pressures and phases within in the concrete (i.e., typical of alkali-silica reactions (ASR), which can lead to cracking and decreased concrete durability), resulting in a refined pore size distribution (i.e., replacing macropores with microporous material) thus improving the strength, durability, and impermeability of the hardened concrete.

Common pozzolans include silica fume and rice husk ash which are both industrial waste products that consist of pure amorphous silica in the form of particles. Pozzolanic particles and cementitious mixtures are well described in U.S. Pat. No. 7,442,248 issued to Timmons on Oct. 28, 2008. The contents of this patent are incorporated herein by reference in their entirety. Pozzolanic particles employed in cementitious applications are typically in the size range of 50-150 nanometers. Pozzolanic particles smaller in size, for example in the range 10-50 nanometers, have higher surface area and hence increased reactivity. Smaller particles are also more likely to react completely and form C—S—H without forming expansive phases typical of ASR. However, particles in this smaller size range are difficult to handle due to the hazardous nature of these particles if inhaled. Additionally, these smaller particles typically decrease the workability of the cementitious mixture, an undesirable result which in turn requires greater pumping pressures and increases the difficulty of mixture placement.

In an effort to lower their water-to-binder ratios, cementitious mixtures used to produce HPCs and UHPCs may include internal curing agents. These agents, typically wet porous aggregate or swollen superabsorbent polymer (SAP) hydrogels, provide a continuous supply of water during curing, thus counteracting self-desiccation and reducing or potentially eliminating autogenous shrinkage and cracking of the cement and achieving a corresponding increase in compressive strength and durability.

SAP hydrogel particles may swell to as much as 100 times their original weight in the presence of water as shown in FIG. 1A. An exemplary SAP hydrogel may be composed of poly(acrylamide(AM)-acrylic acid(AA)) polymer molecules that are chemically cross-linked to neighboring molecules to form a three-dimensional copolymer network that will absorb fluid and swell to form a hydrogel under alkaline conditions. The SAP hydrogels are produced and added to cement as dry particles, and therefore are relatively easy to transport and incorporate into cementitious mixtures. In addition to their strong hydration performance, SAP hydrogels may reduce thermal expansion and tensile creep and enhance freeze/thaw resistance of the cementitious mixture. However, upon water release during cement curing, the particles leave behind voids in the hardened cement, and therefore in the resulting concrete as shown in FIGS. 4A and 4B.

In view of the above, there is an ongoing desire for admixtures capable of modifying or improving the properties and characteristics of cementitious mixtures and concrete formed therewith.

BRIEF DESCRIPTION OF THE INVENTION

The present invention provides cementitious mixtures, compositions for use in cementitious mixtures, and methods of producing cementitious mixtures wherein the compositions are suitable for modifying or improving the properties of the cementitious mixtures and concrete formed therewith. In particular, the compositions include polymers having particles of at least one pozzolanic material incorporated directly into a macromolecular network structure of the polymers.

According to one aspect of the invention, a composition for use as a curing agent in a cementitious mixture includes a superabsorbent polymer (SAP) hydrogel having a macromolecular network structure, and at least one pozzolanic material that is chemically incorporated into the macromolecular network structure of the SAP hydrogel.

According to another aspect of the invention, a cementitious mixture is provided that includes an internal curing agent comprising a superabsorbent polymer (SAP) hydrogel having a macromolecular network structure, and at least one pozzolanic material that is chemically incorporated into the macromolecular network structure of the SAP hydrogel.

According to another aspect of the invention, a method includes providing a polymer composition that is end-functionalized with a chemically reactive group, incorporating a chemically reactive functional group on surfaces of a quantity of particles of a pozzolanic material to form surface-functionalized pozzolanic particles, chemically reacting the surface-functionalized pozzolanic particles with the end-functionalized polymer composition to form a plurality of polymer-grafted pozzolanic particles, incorporating a cross-linking agent into the plurality of polymer-grafted particles to form a composite hydrogel with a macromolecular structure comprising the particles of the pozzolanic material chemically incorporated therein, and incorporating the composite hydrogel into a cementitious mixture.

According to another aspect of the invention, a method includes providing a fluid medium having a quantity of particles of a pozzolanic material therein, incorporating a composition on surfaces of the particles of the pozzolanic material to form surface-functionalized pozzolanic particles, chemically reacting the surface-functionalized pozzolanic particles with at least one monomer composition and at least one chain-transfer agent to form a plurality of polymer-grafted particles, incorporating a cross-linking agent into the plurality of polymer-grafted pozzolanic particles to form a composite hydrogel with a macromolecular structure comprising the particles of the pozzolanic material chemically incorporated therein, and incorporating the composite hydrogel into a cementitious mixture.

Technical effects of the compositions, cementitious mixtures, and methods described above preferably include the capability of incorporating pozzolanic materials into cementitious mixtures with reduced handling risks, while modifying or improving the beneficial effects of both the pozzolanic materials and the superabsorbent polymers within the cementitious mixture relative to separate additions of the two materials.

Other aspects and advantages of this invention will be better appreciated from the following detailed description.

BRIEF DESCRIPTION OF THE DRAWINGS

FIGS. 1A-1C represent superabsorbent polymer (SAP) particles and their swelling behavior under different conditions. FIG. 1A shows macro-scale SAP particles representative of the volume increase from a "dry" dehydrated state (left) to a "wet" water-swollen state (right). FIG. 1B shows a scanning electron image (scale bar=200 microns) representing an angular morphology of dry SAP particles. FIG. 1C represents an approximate size distribution of SAP particles commonly incorporated into mortar mixtures; x-axis reports the sizes as the sieve's mesh opening and the y-axis reports the fraction of total weight that was left behind on the respective sieve.

FIG. 4A shows a backscattered scanning electron microscope (SEM) image of the SAP-cement mixture (cross-sectioned) after three days of curing. Areas formerly occupied by swollen SAP particles appear as large voids (outlined in dashes), which are partially filled with portlandite (arrows). Scale bar is 100 microns. FIG. 4B is an SEM image of the SAP-mortar mixture (cross-sectioned) after about twenty-four hours of curing. Angularly shaped voids left behind from swollen SAP particles and spherical voids from entrapped air bubbles are visible.

FIG. 5A represents a superabsorbent polymer network (SAP); FIG. 5B represents a superabsorbent polymer-pozzolan (SAPP) network where polymer is chemically grafted to the surfaces of pozzolan particles; and FIG. 5C represents a SAPP network with additional ungrafted polymer (SAPP+P).

FIG. 9A reports results using a "fixed-water" (FW) batching method and FIG. 9B reports results using a "fixed-polymer" (FP) batching methods. For the FW batches, for all samples, the total amount of water in the mortar mixture was fixed at a ratio of 0.35 by weight of cement and the dosage of the SAP hydrogels varied for each sample depending on the amount of SAP required to absorb 5% water by weight of cement. For the FP batches, for all samples, the total amount of SAP in the mortar mixture was fixed at 0.2% by weight of cement and the amount of water in each sample was varied based on the maximum swelling capacity of the SAP composition in that sample (determined from separate swelling capacity experiments in which SAP compositions were immersed in cement pore fluid for different lengths of time). All SAP-mortar mixtures displayed improved performance (i.e., less shrinkage) than the control mixture. The SAP compositions containing a higher concentration of AA were the best performers in the fixed-polymer mortar batching method. These results indicate that the overall macro-scale performance of cementitious mixtures containing hydrogel-based internal curing agents is predominately controlled by the polymer macromolecular network structure and chemical composition.

DETAILED DESCRIPTION OF THE INVENTION

Composite hydrogel-based internal curing agents and cementitious mixtures comprising such curing agents are described herein. The curing agents include SAP hydrogels having pozzolanic particles chemically incorporated directly into their polymer macromolecular network structure. Such curing agents have been observed to exhibit increased reactivity and impart greater strength and durability to cured cement relative to conventional internal curing agents, and yet are believed to be less hazardous in preparation and use.

Certain aspects of the invention are described herein in reference to poly(acrylamide(AM)-acrylic acid(AA)) hydrogels; however, it should be understood that the invention is believed to be applicable to any SAP hydrogel. Further, during synthesis of poly(acrylamide(AM)-acrylic acid(AA)) hydrogels, the acrylic acid monomer may be neutralized by adding a base (such as NaOH) to the reaction solution, which converts the acrylic acid to sodium acrylate. As such, the terms poly(acrylamide(AM)-acrylic acid(AA)) and poly(sodium acrylate(PANa)-acrylamide(AM)) are used interchangeably herein.

Figure 8:
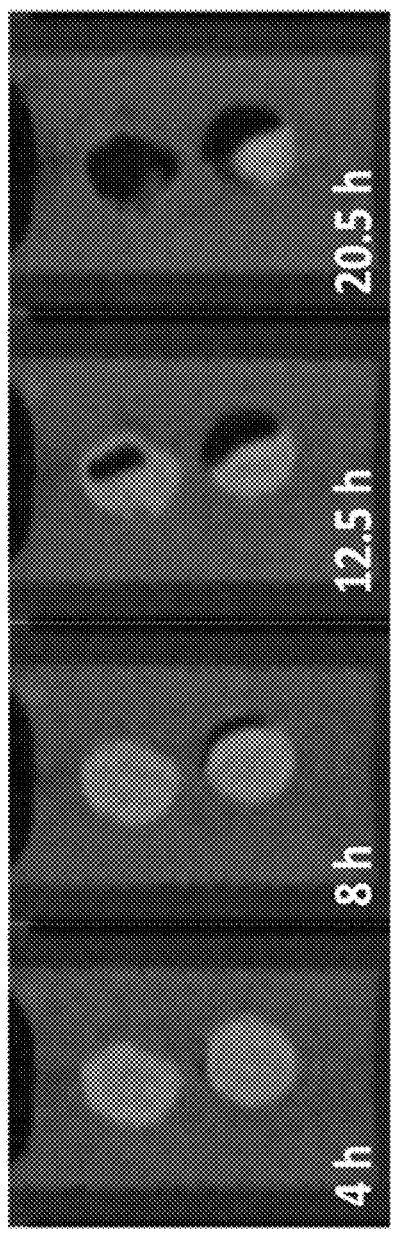
FIG. 8 shows images obtained from neutron tomography of two SAP particles (light grey) surrounded by cement paste after mixing. Shrinking is observed as the SAP particles release water over time, resulting in the formation of vapor-filled void space (dark grey).
Figures 9A, 9B:
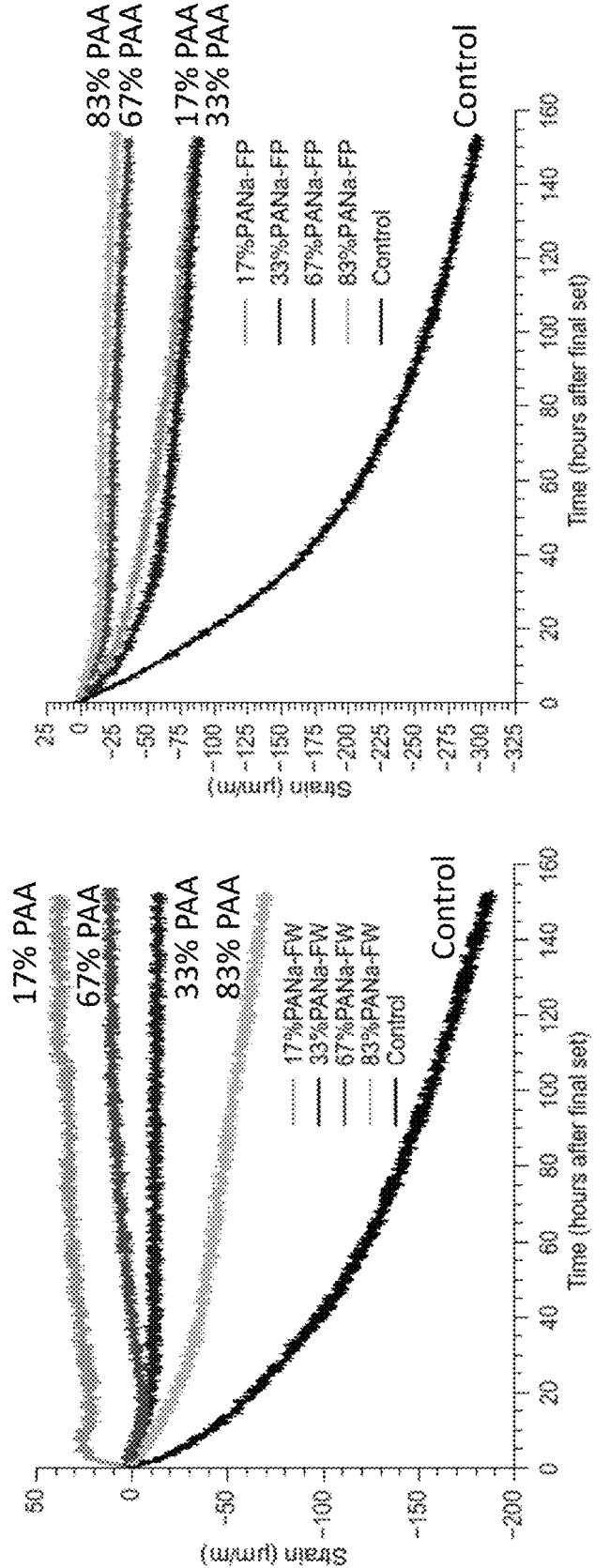
FIGS. 9A and 9B is a representation of autogenous shrinkage measurements of plain mortar and mortar mixtures containing SAP hydrogels with different ratios of AA in their macromolecular network structures.

As previously stated, SAP hydrogels are able to provide a continuous supply of water during curing of cementitious mixtures, thus counteracting self-desiccation and reducing or eliminating autogenous shrinkage and cracking of a cement and achieving a corresponding increase in compressive strength and durability. However, SAP hydrogel particles may leave behind voids in the hardened cement as shown in FIGS. 4 and 8. In addition, investigations leading to the present invention indicated that the absorption capacity of SAP hydrogel particles in the presence of multi-valent ions can be severely reduced and the kinetics radically changed as shown in FIGS. 2A-2D and 3 to the point where the hydrogels actively deswell (i.e., a reduction in the swelling ratio Q is observed with time as fluid is released from the hydrogel) in the presence of multi-valent cations. These characteristics can be a problem because the aqueous fluid in uncured or "fresh" cementitious mixtures naturally contains a variety of multi-valent cations. As an example, the data plotted in FIGS. 2A-2D indicated that greater reductions in absorption (compared with pure and tap water) occurred in the presence of $Ca^{2+}$ cations for SAP hydrogel particles containing higher concentrations of ionizable functional groups in their macromolecular network structures (i.e., the AA segments in the copolymer structure). In alkaline environments (including cementitious mixtures), it is known that AA will deprotonate, forming an anionic moiety that can subsequently form an ionic cross-link with nearby multi-valent ions. This observed reduction in SAP absorption capacity is therefore consistent with the development of $Ca^{2+}$ ionic cross-links within the copolymer macromolecular network structure, as an increased density of cross-links will cause pre-mature deswelling and restrict the overall swollen dimensions of the SAP hydrogel particles.

Figures 2A, 2B:
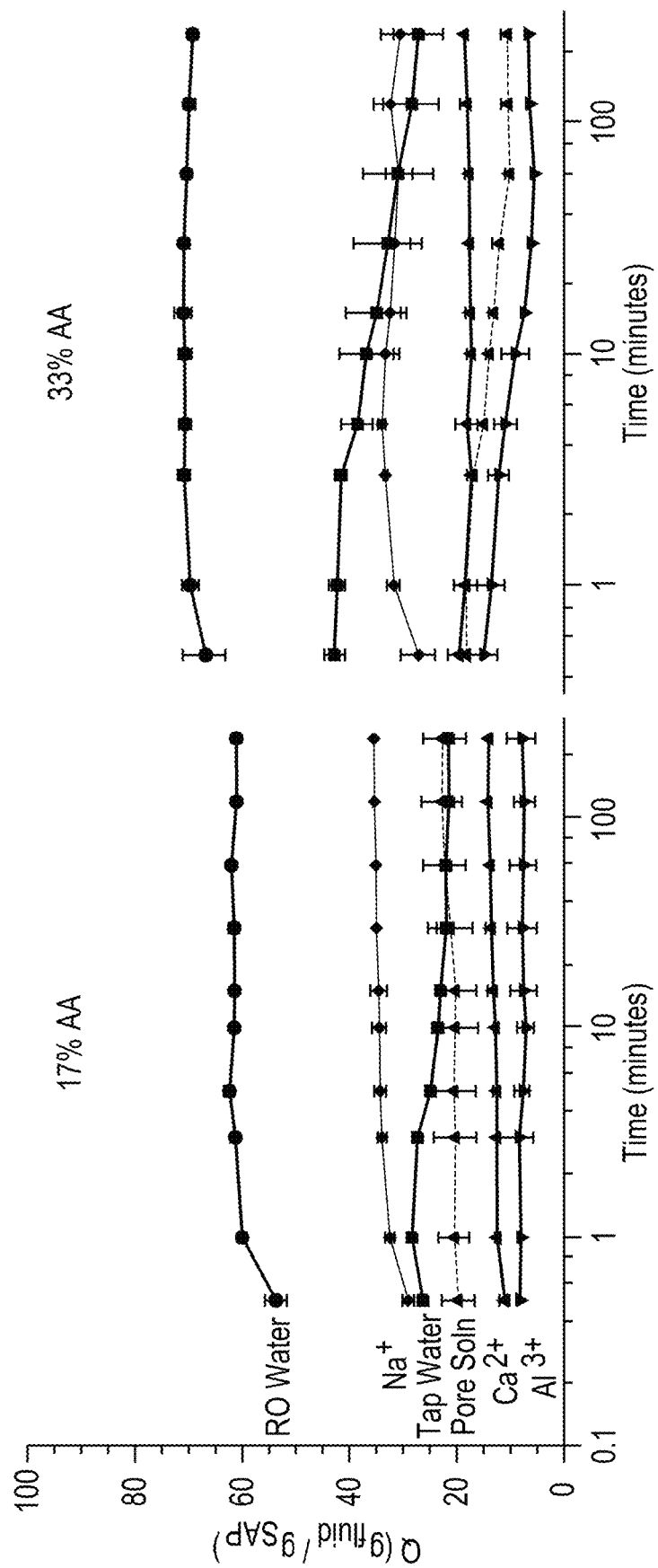
FIGS. 2A-2D contains four graphs (graphs a through d) representing results from an investigation of four types of custom-synthesized SAP particles: 2 wt. % chemically cross-linked poly(acrylic acid(AA)-acrylamide(AM) copolymer networks containing 17% AA (FIG. 2A), 33% AA (FIG. 2B), 67% AA (FIG. 2C), and 83% AA (FIG. 2D). The particles were immersed in pure water, tap water, cement pore solution, and three salt solutions containing $Na^+$, $Ca^{2+}$, or $Al^{3+}$ cations. The swelling ratio (Q) of the SAP particles was quantified as a function of immersion time, where Q is determined by dividing the total mass of fluid that is absorbed by the particles during time by the total mass of the dry SAP particle prior to immersion. Greater Q values indicate greater swelling capacity and the change in Q values over time indicate the swelling kinetics, with some particles swelling faster than others (i.e., greater increase in Q during the same time duration). Compared to their behavior in pure water and tap water, the particles displayed reduced swelling capacity and altered kinetics in the presence of $Ca^{2+}$ and $Al^{3+}$ with the greatest reductions in swelling capacity observed for SAP particles containing higher concentrations of AA in the macromolecular network structure, as shown in graph c and graph d for the 67% and 83% AA, respectively.
Figures 2C, 2D:
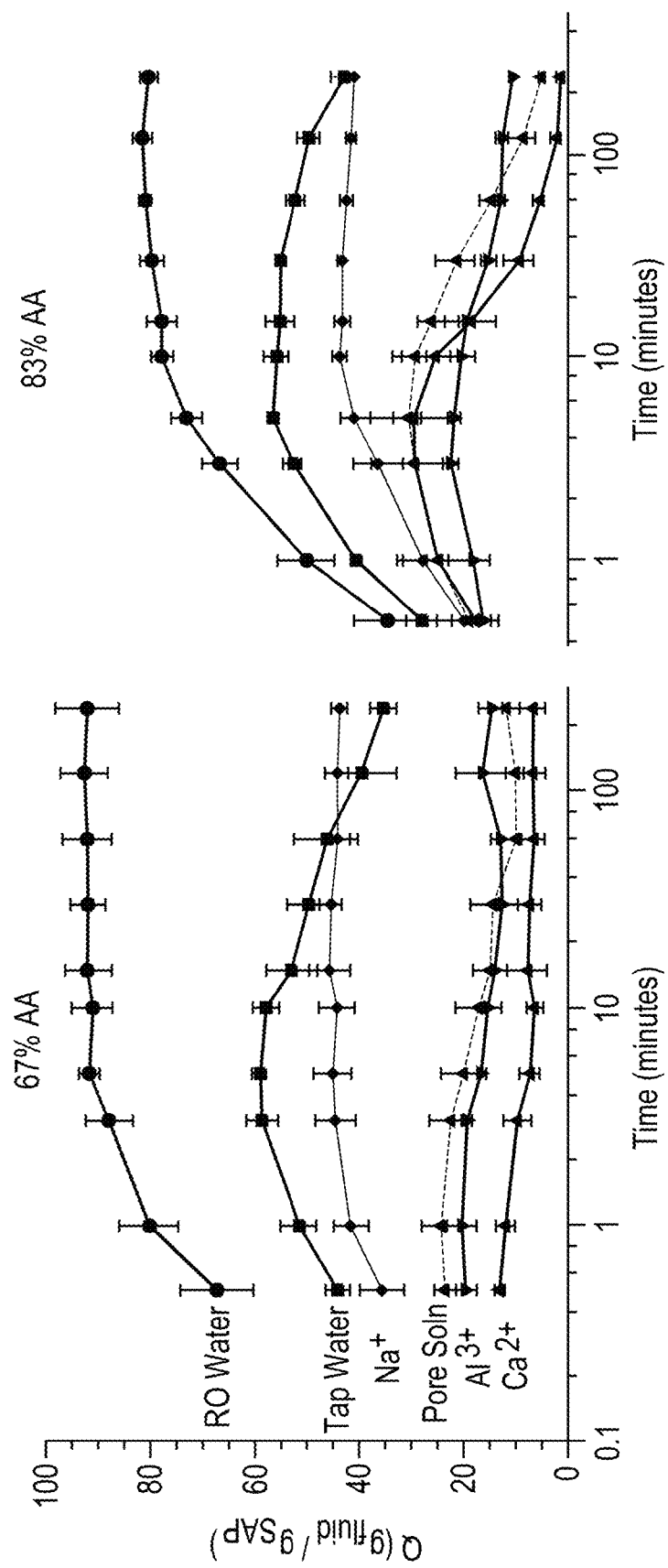
Figure 3:
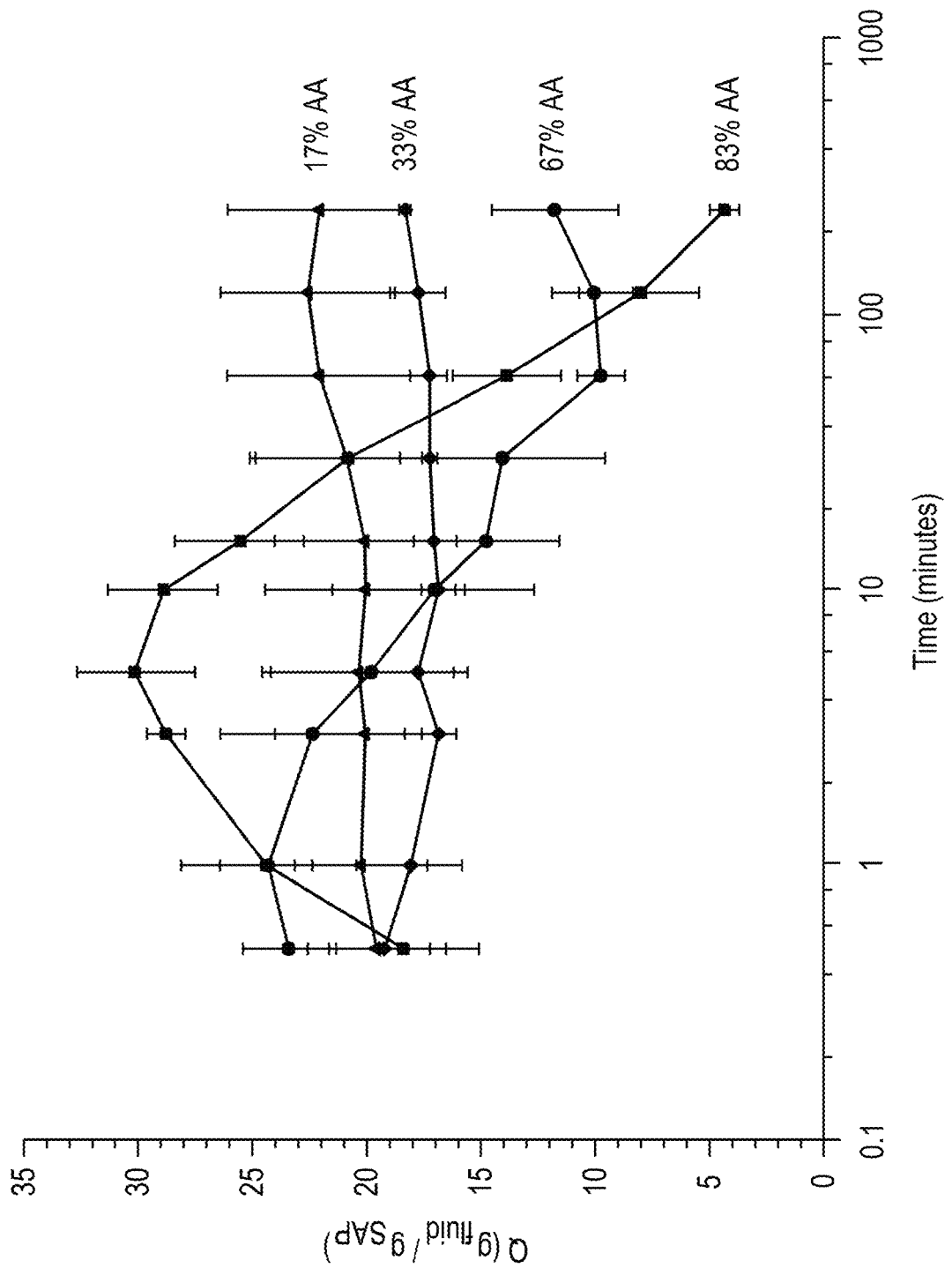
FIG. 3 is a graph representing results from an investigation performed on particles of the four custom-synthesized SAPs of FIGS. 2A-2D, namely, 2 wt. % chemically cross-linked poly(acrylic acid(AA)-acrylamide(AM) copolymer networks containing 17% AA, 33% AA, 67% AA, and 83% AA. Particles were immersed in cement pore fluid, which contained a mixture of ions including $Na^+$, $K^+$, $Ca^{2+}$, $Al^{3+}$, $Fe^{3+}$. The particles that contained the highest concentration of AA displayed rapid deswelling.
Figure 4B:
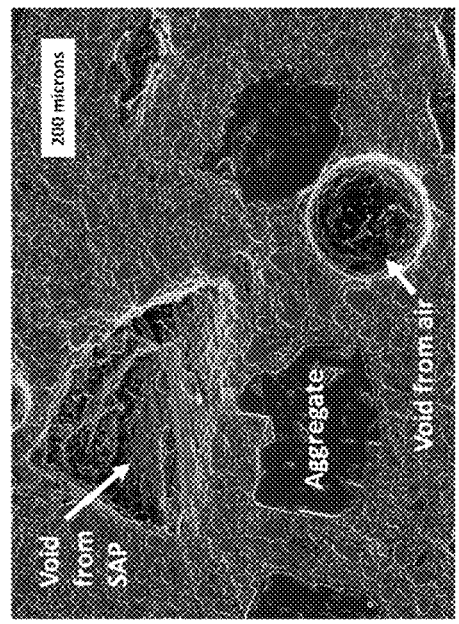
FIGS. 4A and 4B show images of a cementitious mixture containing SAP after setting.
Figure 4A:
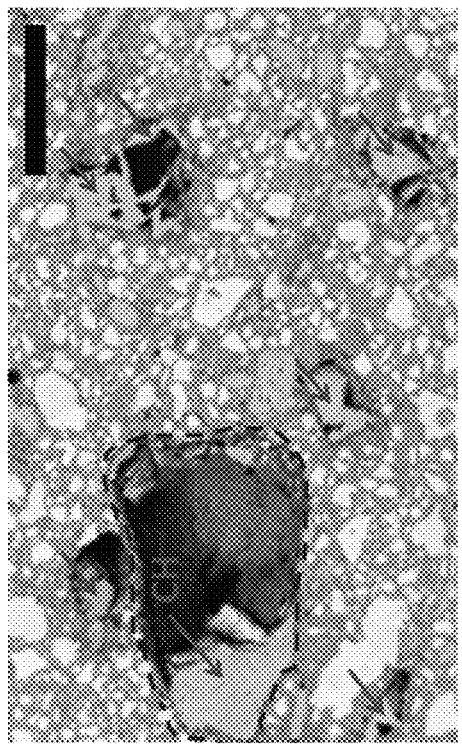

It has been observed that portlandite (a naturally occurring form of calcium hydroxide ($Ca(OH)_2$)) may form in the voids remaining from dehydrated SAP hydrogel particles within a few hours of setting, as shown in FIGS. 4A and 4B. It was hypothesized that the potential for local confinement of $Ca^{2+}$ within SAP hydrogels directly contributes to the precipitation of calcium hydroxide.

The hydrogel-based internal curing agents described herein are intended to promote the cement curing process not only by providing water to fuel the curing reaction, but also by facilitating beneficial pozzolanic reactions to convert calcium hydroxide (portlandite) to calcium silicate hydrates (C—S—H; the main product of the hydration of Portland cement) within the cementitious mixtures that further refines the microstructure and improves the strength and durability of the hardened HPC. To accomplish this goal, the composite hydrogel-based internal curing agents contain pozzolanic materials chemically incorporated into their polymer macromolecular network structures. This is achieved by chemically (covalently) attaching ("grafting") polymer molecules to the surfaces of pozzolanic particles and subsequently cross-linking the polymer molecules to neighboring polymer molecules, forming a three-dimensional superabsorbent polymer-pozzolan composite hydrogel networks referred to herein as "SAPP" hydrogels.

While it is well known that the addition of pozzolanic material to cementitious mixtures can enhance the curing reaction and result in stronger and more durable concrete at reduced cost, there are significant tradeoffs in material processing and properties which can limit the use of pozzolanic materials in HPC and UHPC. However, such shortcomings can be overcome or at least partially alleviated by chemically incorporating pozzolanic particles directly into the polymer macromolecular network structures of the SAPP hydrogels, in a manner that enables the benefits of pozzolan addition in HPC and UHPC to be realized along with the added benefits of easier material handling, improved processability, and reduced autogenous shrinkage. In particular, the benefits to cementitious mixtures by incorporation of the SAPP hydrogels therein are expected to be greater than if the two components (pozzolanic particles and SAP hydrogels) were used and added separately as discrete additives to cementitious mixtures, as they typically are currently used in the construction industry. For example, by chemically incorporating the pozzolanic particles into the polymer macromolecular network structures of SAPP hydrogels, the particles remain in the presence of water (and will thus continue to beneficially catalyze the hydration reaction) but they will be much easier and safer to handle and add to the cementitious mixtures relative to loose particulate pozzolans.

Additionally, as previously discussed, SAP hydrogels tend to attract multi-valent ions (including calcium ions) which are key reactants in the cement hydration reaction. These ions may promote the pozzolanic reaction and potentially even "fill in" the void space that would typically remain in the cement following hydrogel deswelling with cement binder, catalyzed locally by the pozzolanic particles within the hydrogel. Even if the voids are not entirely filled in, the reaction may enhance strength in the void walls. As seen in FIGS. 4A and 4B, some particles dehydrate in such a way that the dry polymer may coat the void walls. In the case of SAPP hydrogels with pozzolanic particles chemically incorporated into their polymer macromolecular network structures, a polymer coating on a void wall resulting from dehydration of the SAPP hydrogel particle may preferentially strengthen the wall region due to the high local concentration of pozzolanic activity or reactivity (which generally refers to the degree of reaction over time or the reaction rate between a pozzolan and $Ca^{2+}$ or $Ca(OH)_2$ in the presence of water).

Regardless of whether the voids are entirely filled, chemical incorporation of pozzolan particles within the SAPP hydrogels is able to decrease the heat of hydration, increase the internal relative humidity (RH), decrease the autogenous shrinkage of the mixture, and/or minimize the appearance of large pores and microcracks within the hardened cement microstructure, thereby increasing the compressive strength and durability of the concrete. The magnitude of these effects appears to be directly dependent on the pozzolan reactivity, which is related to the polymer grafting density (with higher grafting densities resulting in reduced reactivity). Thus, the grafting density of polymer molecules on the surface of the pozzolanic particle may be used to control the reactivity of the particle and thus create a tunable response for different types of concrete.

Various methods may be used to produce the SAPP (and SAPP+P, described hereinafter) hydrogels with controlled variation in pozzolan content and morphology, polymer-pozzolan grafting density, and polymer macromolecular network structure and chemical composition.

According to one nonlimiting method for producing a SAPP hydrogel, polymer-grafted pozzolanic particles are created with a "grafting to" method utilizing a pre-synthesized uncross-linked polymer composition that is end-functionalized so that it can covalently react with the surface of pozzolanic materials. A polymer composition with a desired molecular weight may be synthesized by controlled radical polymerization from free monomer, initiator, and chain transfer agent in solution. A nonlimiting example of a suitable polymer composition includes a silane- or alkyne-terminated poly(AA-AM) copolymer (molecular weight, MW, of 500-100,000 g/mol). A chemically reactive functional group (nonlimiting example, chlorosilane) is incorporated on surfaces of particles of a pozzolanic material to form surface-functionalized particles of the pozzolanic material of varying grafting density (from 0.05 to 0.5 molecules/nm$^2$), for example, under nitrogen atmosphere at about 70° C. via sonication or reflux in a solvent. The end-functionalized polymer composition is then chemically reacted with the surface-functionalized pozzolanic particles, for example, under nitrogen at about 70° C. in a solvent, to form polymer-grafted pozzolanic particles. The grafting density of polymer on the surface of the pozzolanic particles can be varied. To form a SAPP hydrogel, a covalent cross-linking agent is added (nonlimiting example, n,n-methylenebisacrylamide, at a concentration of 0.2-10% by weight of polymer) to a plurality of the polymer-grafted pozzolanic particles to create a covalently bonded, three-dimensional superabsorbent polymer-pozzolan composite (SAPP) hydrogel with a macromolecular structure containing particles of the pozzolanic material. Weight percent of pozzolanic particles in the SAPP hydrogel may range from about 0.5 percent particles by weight of polymer (for a relatively high polymer grafting density on the pozzolanic particle surface and a relatively high density of covalent cross-links) to about 90 percent particles by weight of polymer (for a relatively low polymer grafting density on the pozzolanic particle surface and a relatively low density of covalent cross-links).

According to another nonlimiting method for producing a SAPP hydrogel, polymer-grafted pozzolanic particles are created with a "grafting from" controlled radical polymerization method. The method includes providing a quantity of pozzolanic material in a particulate form in a volume of fluid medium. A small molecule with acceptable functionality for reactivity or chain transfer agent is incorporated on surfaces of the particles of pozzolanic material to form surface-functionalized particles of the pozzolan, for example, under nitrogen atmosphere at about 70° C. via sonication or reflux in solvent. The surface-functionalized particles are then chemically reacted with at least one monomer composition and at least one free chain-transfer agent, resulting in a plurality of polymer-grafted pozzolanic particles with controlled polymer MW of 500-100,000 g/mol and varying grafting density (from 0.05 to 0.5 molecules/nm$^2$). A cross-linking agent (nonlimiting example, n,n-methylenebisacrylamide, at a concentration of 0.2-10% by weight of polymer) is then incorporated into the plurality of polymer-grafted particles to create a covalently bonded, three-dimensional superabsorbent polymer-pozzolan composite (SAPP) hydrogel with a macromolecular structure containing particles of the pozzolanic material. Weight percent of pozzolanic particles in the SAPP hydrogel may range from about 0.5 percent particles by weight of polymer (for a relatively high polymer grafting density on the pozzolanic particle surface and a relatively high density of covalent cross-links) to about 90 percent particles by weight of polymer (for a relatively low polymer grafting density on the pozzolanic particle surface and a relatively low density of covalent cross-links).

As a modification to the above described synthesis method, rather than reacting the cross-linking agent solely with polymer-grafted pozzolanic particles, select ratios of pre-synthesized polymer (uncross-linked, with MW ranging from 500-50,000 g/mol) may be mixed with a plurality of polymer-grafted particles and the entire mixture cross-linked with the cross-linking agent to yield a SAPP hydrogel network with additional ungrafted polymer incorporated into the polymer macromolecular network structure, referred to herein as a SAPP+P hydrogel. The weight fraction range of pozzolanic materials in SAPP+P hydrogels may be similar to the range previously specified and is ultimately dependent on the molecular weight of the grafted polymer and uncross-linked polymer.

Figures 5A, 5B, 5C:
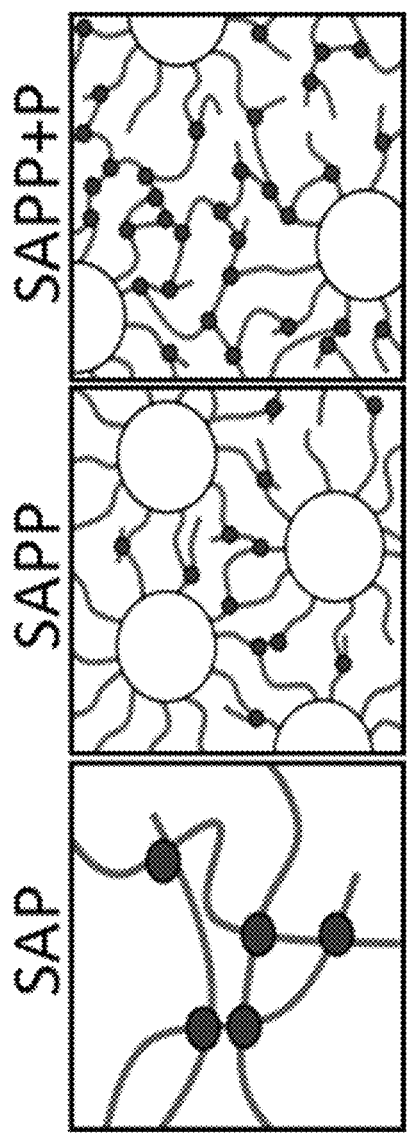
FIGS. 5A-5C schematically represents composite hydrogel-based internal curing agents that chemically incorporate pozzolanic particles into their polymer macromolecular network structures. The lines indicate the polymer, solid dots indicate the chemical cross-links, and large circles indicate the pozzolanic particles.
Figure 6:
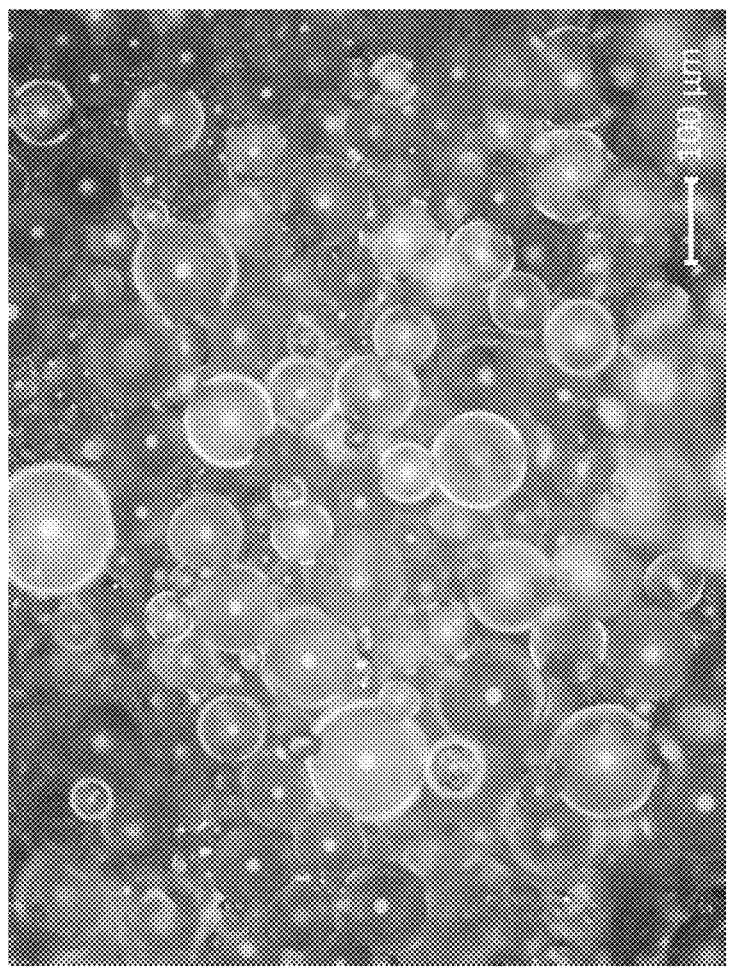
FIG. 6 shows an optical image of a collection of dry suspension polymerized SAP particles that are spherical in shape, demonstrating the ability to make regularly shaped particles with tunable diameters in the range of 10s to 100s of microns based on selected processing parameters.
Figure 7:
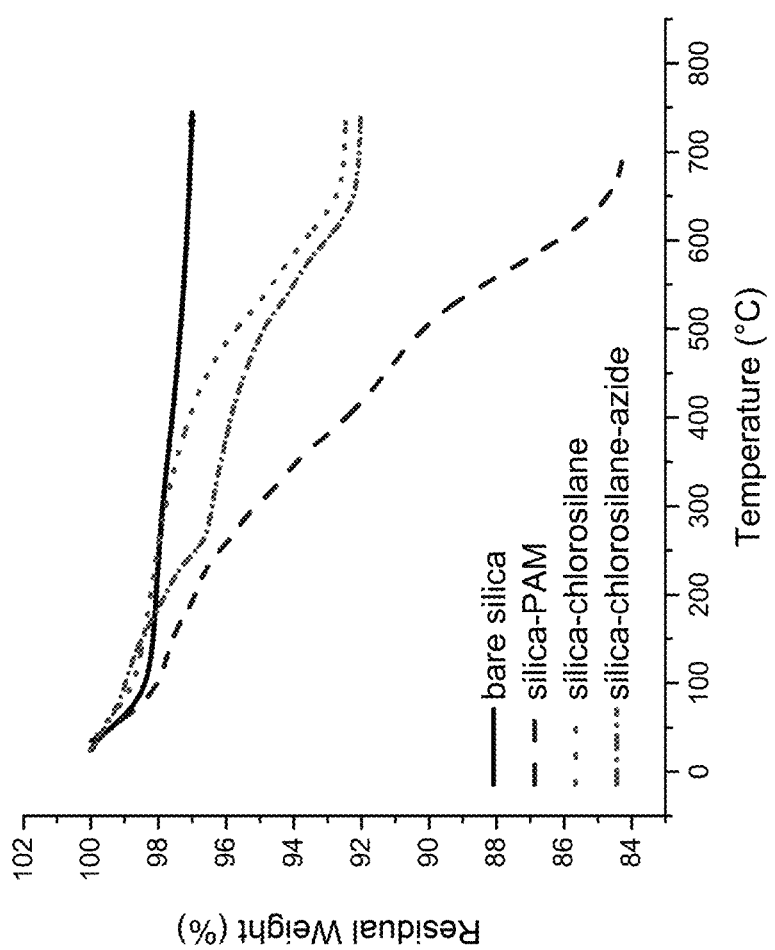
FIG. 7 represents preliminary thermogravimetric analysis (TGA) results of 60-nm silica particles, including "bare" silica particles, silica-PAM particles that were functionalized with poly(acrylamide) (PAM) polymer which had been covalently attached to ("grafting to") surfaces of the particles, and silica-chlorosilane and silica-chlorosilane-azide (functionalization of silica with a chlorosilane molecule and further functionalization with an azide-containing molecule) particles which were products of intermediate synthesis steps and degrade from their silica surfaces at high temperatures. Results from the silica-chlorosilane and silica-chlorosilane-azide indicate that by 700° C., approximately 6% mass had been lost compared to the bare silica particles. Results from the silica-PAM particles indicate that by 700° C., an additional 8% mass has been lost compared with the functionalized silica particles and this mass can be attributed to PAM that was chemically bound to their silica surfaces. These results indicate that the synthesis methods described herein are able to successfully form silica particles that contain polymers which are chemically bound (or grafted) to the surfaces of the particles, as compared to polymers that are only weakly physically bound. The formation of a strong chemical bond between the polymers and the surface of silica particles is preferred to form a robust SAPP hydrogel that can withstand (i.e., that does not chemically degrade or dissolve in) the highly alkaline environment of cementitious mixtures and function effectively as an internal curing agent.

FIGS. 5A-5C schematically represents SAP, SAPP, and SAPP+P hydrogel networks comprising polymers (lines), chemical cross-links (solid dots), and pozzolanic particles (larger circles). Irregularly shaped composite hydrogel particles can be created by drying and crushing the products of any one or more of the two different synthesis procedures described above for SAP, SAPP, and SAPP+P. Regular-shaped particles, for example, spherical-shaped or cylindrical-shaped particles (FIG. 6), can be created using test tube reaction vessels or suspension polymerization methods (for example, adapting the nonlimiting two different synthesis procedures described above for use in a non-solvent environment, such as cyclohexane).

In general, pozzolanic materials capable of use in embodiments described above can be any siliceous or siliceous and aluminous materials that has little to no hydraulic reactivity, that is, it does not form a binder in the presence of water. Non-limiting examples of pozzolanic materials for SAPP and SAPP+P hydrogels include, but not limited to, Class C fly ash, silica fume, metakaolin, rice husk ash, Class F fly ash, slag, and/or calcined shale. Various sizes of the pozzolanic particles may be used, including particle sizes commonly used in cementitious mixtures. For example, silica nanoparticles may have diameters of about 10-100 nm, silica fume particles may have diameters of about 100-1000 nm, and rice husk ash and other natural pozzolanic particles may have diameters greater than 1 μm, though pozzolanic particles of other sizes are also within the scope of the invention. The SAPP and SAPP+P hydrogels preferably comprise pozzolanic particles in an amount of about 75 to 90 percent by weight in order to both catalyze a beneficial reaction in the concrete while still comprising enough polymer to swell and act as an internal curing agent.

In addition, it should be recognized that a cementitious mixture may include other pozzolanic materials or other additives in addition to those contained in the SAPP or SAPP+P hydrogels, or may include multiple types of SAPP or SAPP+P hydrogels each containing different pozzolanic materials. Further, the cementitious mixture may include SAPP or SAPP+P hydrogels that comprise only one type of pozzolanic material, or may comprise more than one pozzolanic material chemically incorporated into its macromolecular network structure.

While the invention has been described in terms of specific embodiments, it is apparent that other forms could be adopted by one skilled in the art. For example, the chemical and physical composition of the SAP hydrogels could differ from that described, other materials could be incorporated into the macromolecular network structure of the SAP hydrogels, and materials and processes/methods other than those noted could be used. Therefore, the scope of the invention is to be limited only by the following claims.

The invention claimed is:

1. A cementitious mixture comprising a cement material and a composite hydrogel-based internal curing agent, wherein the internal curing agent comprises:
   a superabsorbent polymer (SAP) hydrogel having a macromolecular network structure; and
   particles of at least one pozzolanic material that is chemically incorporated into the macromolecular network structure of the SAP hydrogel wherein the internal curing agent contains 75 to 90 percent by weight of the at least one pozzolanic material incorporated into the SAP hydrogel.

2. The cementitious mixture of claim 1, wherein the at least one pozzolanic material is selected from the group consisting of Class C fly ash, silica fume, metakaolin, rice husk ash, Class F fly ash, slag, calcined shale, and any combination thereof.

3. The cementitious mixture of claim 1, wherein the cementitious mixture comprises more than one pozzolanic material chemically incorporated into the macromolecular network structure of the SAP hydrogel.

4. The cementitious mixture of claim 3, wherein the more than one pozzolanic material is selected from the group consisting of Class C fly ash, silica fume, metakaolin, rice husk ash, Class F fly ash, slag, calcined shale, and any combination thereof.

5. The cementitious mixture of claim 1, wherein the cementitious mixture further comprises an ungrafted polymer or an additional SAP hydrogel with a different pozzolanic material that is chemically incorporated into the additional SAP hydrogel.

6. The cementitious mixture of claim 1, wherein the internal curing agent further comprises ungrafted polymer incorporated into the macromolecular network structure of the SAP hydrogel.

7. The cementitious mixture of claim 1, wherein the internal curing agent is irregularly-shaped particles.

8. The cementitious mixture of claim 1, wherein the internal curing agent is spherical-shaped and/or cylindrical-shaped particles.

9. A method of forming the cementitious mixture of claim 1, the method comprising:
   providing a polymer composition that is end-functionalized with a chemically reactive group;
   incorporating a chemically reactive functional group on surfaces of a quantity of the particles of the at least one pozzolanic material to form surface-functionalized pozzolanic particles;
   chemically reacting the surface-functionalized pozzolanic particles with the polymer composition that is end-functionalized to form a plurality of polymer-grafted pozzolanic particles;
   incorporating a cross-linking agent into the plurality of polymer-grafted pozzolanic particles to form the internal curing agent comprising the SAP hydrogel with the at least one pozzolanic material chemically incorporated into the macromolecular network structure of the SAP hydrogel; and
   incorporating the internal curing agent into the cement material;
   wherein the internal curing agent contains 75 to 90 percent by weight of the at least one pozzolanic material incorporated into the SAP hydrogel.

10. The method of claim 9, wherein the particles of the at least one pozzolanic material are particles of a first pozzolanic material, the method further comprising chemically reacting the polymer composition with a second type of surface-functionalized particles comprising a second pozzolanic material such that the particles of both the first and second pozzolanic materials are chemically incorporated into the macromolecular network structure of the composite hydrogel-based internal curing agent.

11. The method of claim 9, wherein the at least one pozzolanic material is selected from the group consisting of Class C fly ash, silica fume, metakaolin, rice husk ash, Class F fly ash, slag, calcined shale, and any combination thereof.

12. The method of claim 9, wherein the cementitious mixture comprises more than one pozzolanic material chemically incorporated into the macromolecular network structure of the SAP hydrogel.

13. The method of claim 12, wherein the more than one pozzolanic material is selected from the group consisting of Class C fly ash, silica fume, metakaolin, rice husk ash, Class F fly ash, slag, calcined shale, and any combination thereof.

14. The method of claim 9, wherein the composite hydrogel is irregularly-shaped, spherical-shaped, and/or cylindrical-shaped particles.

15. A method of forming the cementitious mixture of claim 1, the method comprising:

provinding a fluid medium having a quantity of the particles of the at least one pozzolanic material therein;

incorporating a composition on surfaces of the particles of the at least one pozzolanic material to form surface-functionalized pozzolanic particles;

chemically reacting the surface-functionalized pozzolanic particles with at least one monomer composition and at least one chain-transfer agent to form a plurality of polymer-grafted particles;

incorporating a cross-linking agent into the plurality of polymer-grafted pozzolanic particles to form the internal curing agent comprising the SAP hydrogel with the at least one pozzolanic material chemically incorporated into the macromolecular network structure of the SAP hydrogel; and incorporating the internal curing agent into the cement material;

wherein the internal curing agent contains 75 to 90 percent by weight of the at least one pozzolanic material incorporated into the SAP hydrogel.

16. The method of claim 15, wherein the at least one pozzolanic material is selected from the group consisting of Class C fly ash, silica fume, metakaolin, rice husk ash, Class F fly ash, slag, calcined shale, or any combination thereof.

* * * * *